United States Patent
Qian et al.

(10) Patent No.: US 9,462,266 B2
(45) Date of Patent: Oct. 4, 2016

(54) DISPLAY APPARATUS, DISPLAY APPARATUS FAULT ANALYSIS SYSTEM AND DISPLAY APPARATUS FAULT ANALYSIS METHOD

(71) Applicant: BOE TECHNOLOGY GROUP CO., LTD., Beijing (CN)

(72) Inventors: Chenfei Qian, Beijing (CN); Yuewei Zheng, Beijing (CN); Guanghui Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 14/739,918

(22) Filed: Jun. 15, 2015

(65) Prior Publication Data

US 2016/0112702 A1    Apr. 21, 2016

(30) Foreign Application Priority Data

Oct. 20, 2014    (CN) .......................... 2014 1 0559015

(51) Int. Cl.
H04N 17/04    (2006.01)
G06T 7/00    (2006.01)
H04N 17/00    (2006.01)

(52) U.S. Cl.
CPC ............. *H04N 17/045* (2013.01); *G06T 7/001* (2013.01); *H04N 17/004* (2013.01); *G06T 2207/10016* (2013.01)

(58) Field of Classification Search
USPC ....................................................... 348/177
See application file for complete search history.

(56) References Cited

U.S. PATENT DOCUMENTS

| 3,567,163 | A | * | 3/1971 | Kepp | ..................... F41G 7/303 244/3.14 |
| 3,988,534 | A | * | 10/1976 | Sacks | .................... G01S 3/7864 348/171 |
| 4,941,193 | A | * | 7/1990 | Barnsley | ................ H04N 19/99 345/555 |
| 6,999,673 | B1 | * | 2/2006 | Kadono | ............... H04N 19/895 348/398.1 |

(Continued)

FOREIGN PATENT DOCUMENTS

CN    102081895 A    6/2011
CN    102184694 A    9/2011

OTHER PUBLICATIONS

First Chinese Office Action, for Chinese Patent Application No. 2014105590151, dated Jun. 28, 2016, 12 pages.

*Primary Examiner* — Paulos M Natnael
(74) *Attorney, Agent, or Firm* — Kinney & Lange, P.A.

(57) ABSTRACT

Embodiments of the disclosure provide a display apparatus, a display apparatus fault analysis system and a display apparatus fault analysis method. The display apparatus fault analysis system comprises a display apparatus and a server. The display apparatus comprises: a display chip configured to generate a target video or a target image according to a display instruction; an image capturer configured to capture the target image; a detection unit configured to, upon receipt of a fault detection instruction, send the display instruction to the display chip, compare the target image frame or the target image with a predetermined reference image to obtain a difference between the target image frame or the target image and the predetermined reference image, and generate a fault code based on the difference; and a communication module configured to transmit the fault code to a server.

15 Claims, 5 Drawing Sheets

(56) References Cited

U.S. PATENT DOCUMENTS

| | | | |
|---|---|---|---|
| 7,719,598 B2* | 5/2010 | Ortyn | C12Q 1/6816 348/335 |
| 2002/0051953 A1* | 5/2002 | Clark | F41A 33/02 434/16 |
| 2002/0054032 A1* | 5/2002 | Aoki | H04N 7/142 345/204 |
| 2002/0141740 A1* | 10/2002 | Matsui | H04N 21/23432 386/263 |
| 2004/0114789 A1* | 6/2004 | Saha | G06T 7/602 382/128 |
| 2005/0276443 A1* | 12/2005 | Slamani | G06K 9/00208 382/103 |
| 2006/0109422 A1* | 5/2006 | Clark | A61B 3/112 351/205 |
| 2007/0035615 A1* | 2/2007 | Kung | H04N 5/232 348/14.08 |
| 2009/0046061 A1* | 2/2009 | Denoue | G06F 3/0304 345/158 |
| 2009/0225164 A1* | 9/2009 | Renkis | G08B 13/19656 348/143 |
| 2010/0014708 A1* | 1/2010 | Hsu | G06T 7/0042 382/103 |
| 2011/0019244 A1* | 1/2011 | Uwatoko | G06K 9/3275 358/448 |
| 2011/0279389 A1* | 11/2011 | Yamazoe | G06F 3/041 345/173 |

* cited by examiner

DISPLAY APPARATUS, DISPLAY APPARATUS FAULT ANALYSIS SYSTEM AND DISPLAY APPARATUS FAULT ANALYSIS METHOD

This application claims priority from CN Patent Application No. 201410559015.1, filed on Oct. 20, 2014, which is incorporated herein by reference in its entirety.

TECHNICAL FIELD

The disclosure generally relates to a technical field of displaying, more particularly, to a display apparatus, a display apparatus fault analysis system and a display apparatus fault analysis method.

BACKGROUND

Display apparatuses have been widely used. For example, there are display screens for displaying pictures in such places as shopping malls, factories, schools, buses, etc. Display apparatuses can display such information as text, pictures, video, etc. A considerable amount of them are mounted in the open air or in public places. Since the display apparatuses are distributed geographically, it is difficult and inefficient to monitor their faults timely and accurately. In addition, a person who checks whether a display apparatus has a fault or analyzes the fault is usually not a professional maintenance engineer and thus cannot accurately determine the fault type. Furthermore, a conventional display apparatus feeds back a small amount of information to a maintainer. This increases the workload of the maintainer and meanwhile makes it difficult to ensure the efficiency and accuracy of the maintenance operation.

SUMMARY

An embodiment of the disclosure provides a display apparatus, comprising: a display chip configured to generate a target video or a target image according to a display instruction; an image capturer configured to capture a target image frame in the target video or the target image; a detection unit configured to, upon receipt of a fault detection instruction, send the display instruction to the display chip, compare the target image frame or the target image with a predetermined reference image to obtain a difference between the target image frame or the target image and the predetermined reference image, and generate a fault code based on the difference; and a communication module configured to transmit the fault code to a server.

Preferably, the display apparatus further comprises a display panel configured to display the target video or the target image. The image capturer captures the target video or the target image from the display panel.

The disclosure also provides a display apparatus fault analysis system, which comprises: the display apparatus described in any of the above two paragraphs; and a server configured to parse the fault code to obtain fault information, look up a fault type in a prestored fault table based on the fault information, determine a weight of a fault based on the fault type, and generate prompt information according to the weight.

Preferably, the server is further configured to: compare the weight with a predetermined weight; transmit the prompt information to a maintenance terminal, when the weight is greater than the predetermined weight; and transmit self-maintenance information corresponding to the weight back to the display apparatus so that the display apparatus performs a maintenance operation corresponding to the self-maintenance information to maintenance the fault by itself, when the weight is less than or equal to the predetermined weight.

Preferably, the display apparatus is configured to transmit self-maintenance failure information to the server in case the self-maintenance fails, and the server is configured to generate the prompt information and transmit the prompt information to the maintenance terminal.

Preferably, the server is further configured to, when the weight is greater than the predetermined weight, obtain maintenance information for a fault of the fault type according to historical data and transmit the maintenance information to the maintenance terminal.

Preferably, the server is further configured to, when the weight is greater than the predetermined weight, acquire leaving factory information of the display apparatus and transmit the leaving factory information to the maintenance terminal.

Preferably, the server is configured to: determine whether a serving time of the display apparatus is longer than a replacement warranty period or not based on the leaving factory information; transmitting replacement information to the maintenance terminal, if the serving time is shorter than or equal to the replacement warranty period; determining whether the serving time is longer than a maintenance warranty period or not, if the serving time is longer than the replacement warranty period; transmitting maintenance warranty information to the maintenance terminal, if the serving time is shorten than or equal to the maintenance warranty period; transmitting a maintenance request to the maintenance terminal, if the serving time is longer than the maintenance warranty period.

Preferably, the server is further configured to obtain a manufacturer of the display apparatus from the leaving factory information and transmit the fault information to a manufacturer terminal.

Preferably, the communication module is further configured to transmit a communication request to the server before transmitting the fault code to the server and establish a communication link with the server after receiving an acknowledgement transmitted back from the server. The server obtains identification information of the display apparatus from the communication request, and transmits the acknowledgement back to the communication module when the identification information is matched with prestored identification information.

Preferably, the server is further configured to: check the fault information to determine whether the fault information is in conformity with a predetermined format or not; obtain the fault type from the fault information, if the fault information is in conformity with the predetermined format; transmit a retransmission request to the communication module so that the communication module retransmits the fault code, if the fault information is not in conformity with the predetermined format.

Another embodiment of the disclosure provides a display apparatus fault analysis method, comprising: upon receipt of a fault detection instruction, generating, by a display apparatus, a target video or a target image and capturing a target image frame in the target video or the target image; comparing, by the display apparatus, the target image frame or the target image with a predetermined reference image to obtain a difference between the target image frame or the target image and the predetermined reference image, generating a fault code based on the difference and transmitting the fault code to the server; parsing, by the server, the fault code to obtain fault information, obtaining a fault type from the fault information, determining a weight of the fault based on the fault type, and generating prompt information according to the weight.

With the above solutions, it is possible to quickly and accurately provide prompt information to a maintenance terminal (a maintainer) when a fault occurs in the display apparatus, thereby making it convenient for the maintainer to maintain the display apparatus. Additionally, it is possible to automatically analyze the leaving factory information of the display apparatus, thereby suggesting a replacement or warranty scheme to the maintainer when a fault occurs and thus saving money for the maintenance service provider. Furthermore, it is possible for the display apparatus to maintain a fault by itself when the fault is of low severity.

BRIEF DESCRIPTION OF THE DRAWINGS

The features and advantages of embodiments of the disclosure can be better understood by referring to drawings which are illustrative and should not be construed as limiting the embodiments of the disclosure in any way and in which.

DETAILED DESCRIPTION OF EMBODIMENTS

Figure 1:
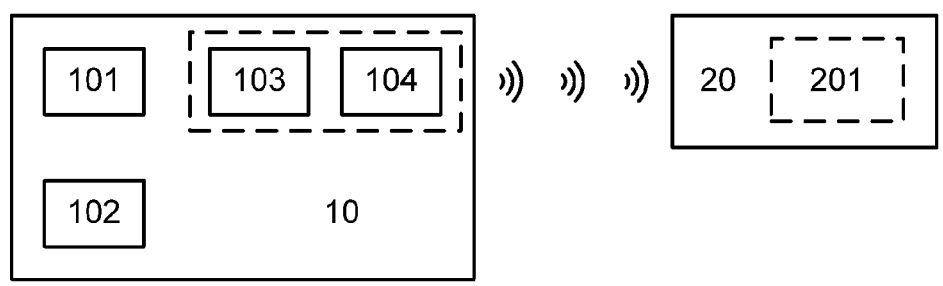
FIG. 1 is a diagram illustrating communications in a display apparatus analysis system according to an embodiment of the disclosure.

In the following, embodiments of the disclosure will be described in further detail with reference to drawings and detailed implementations, in order to facilitate a better understanding of the objects, features and advantages of the embodiments of the disclosure. It shall be noted that, in case no conflict is incurred, embodiments of the disclosure and features in the embodiments may be combined with each other.

Many details will be set forth in the following description in order to facilitate a thorough understanding of the embodiments of the disclosure. However, the embodiments of the disclosure may also be implemented in other manners than those described herein. Therefore, the protection scope of the disclosure is not limited by the embodiments disclosed in the following.

According to an embodiment of the disclosure, there is provided a display apparatus 10, which comprises: a display chip 101 configured to generate a target video or a target image according to a display instruction; an image capturer 102 configured to capture a target image frame in the target video or the target image; a detection unit 103 configured to, upon receipt of a fault detection instruction, send the display instruction to the display chip, compare the target image frame or the target image with a predetermined reference image to obtain a difference between the target image frame or the target image and the predetermined reference image, and generate a fault code based on the difference; and a communication module 104 configured to transmit the fault code to a server.

Preferably, the display apparatus 10 further comprises a display panel configured to display the target video or the target image. The image capturer 102 captures the target video or the target image from the display panel.

As shown in FIG. 1, a display apparatus fault analysis system according to an embodiment of the disclosure comprises the display apparatus 10 and a server 20. The server 20 parses the fault code to obtain fault information, looks up a fault type in a prestored fault table based on the fault information, determines a weight of a fault based on the fault type, and generate prompt information according to the weight.

The display apparatus 10 may perform self-inspection (for example, whenever it is started up or when a user instruction is received), by capturing an image or an image frame displayed by itself, comparing the captured image or image frame with a reference image and, based on a difference resulting from the comparison, generating a fault code, which is analyzed by the server 20 to generate prompt information. As such, it is possible to quickly and accurately determine whether a fault occurs in the display apparatus 10 or not without requiring manual inspection (of course, manual inspection may be involved as required), thereby improving the efficiency of fault detection and the accuracy of the detection and reducing the amount of manual work.

The server 20 may be provided with a database 201 for storing one or more pieces of information on the display apparatus 10. For example, a fault table as shown in Table 1 may be prestored in the database.

TABLE 1

| | |
|---|---|
| 0X0000 | No fault |
| 0X0001 | Screen display error |
| 0X0002 | PANNEL voltage low |
| 0X0004 | Backlight on_off voltage low |
| 0X0008 | System 3.3 V Voltage low |
| 0X0010 | V39 initialization failure |
| 0X0020 | Voltage sampling failure |

Simply by parsing the fault code, the server 20 can obtain fault information. The fault information includes a current fault type code of the display apparatus 10, for example 0X0020. The corresponding fault type found in Table 1 is voltage sampling failure. Thus, the type of the fault is accurately obtained.

Further, different fault types correspond to different weights. For example, a severe fault type corresponds to a high weight while a minor fault type corresponds to a low weight. For example, "Screen display error" and "V39 initialization failure" are very severe fault types and may correspond to a weight of 3. "PANNEL voltage low", "System 3.3V voltage low" and "Backlight on_off voltage low" are less severe fault types and may correspond to a weight of 2. "Voltage sampling failure" is a minor fault and may correspond to a weight of 1. "No fault" may correspond to a weight of 0. According to different weights, different prompt information may be generated for prompting a maintainer to take corresponding actions. As the fault is analyzed quickly and accurately, it is possible for the maintainer to perform maintenance operations quickly and accurately.

It shall be noted that Table 1 is just for exemplification and illustration. The fault types of the display apparatus 10 according embodiments of the disclosure are not limited to those in Table 1 but can be augmented according to circumstances.

An ARM detection unit may be used as the detection unit 103 (of course, some other type of detection unit, such as FPGA, may be used as required), and a 2G communication module may be used as the communication module 104 (of course, some other type of communication module, such as 3G or 4G communication module, may be used as required). The detection unit 103 and the communication module 104 may be integrated on a single ARM circuit board to improve the speed of data communications between the two units and save the space they occupy.

A display chip of model V39 may be used as the display chip 101, and a camera may be used as the image capturer 102 (of course, some other image capturing element may be used as required) for capturing an image or an image frame from the display panel. It is also possible to use a data capturing element that is built into the display apparatus for obtaining an image frame of a video or an image generated by the display chip.

Figure 2:
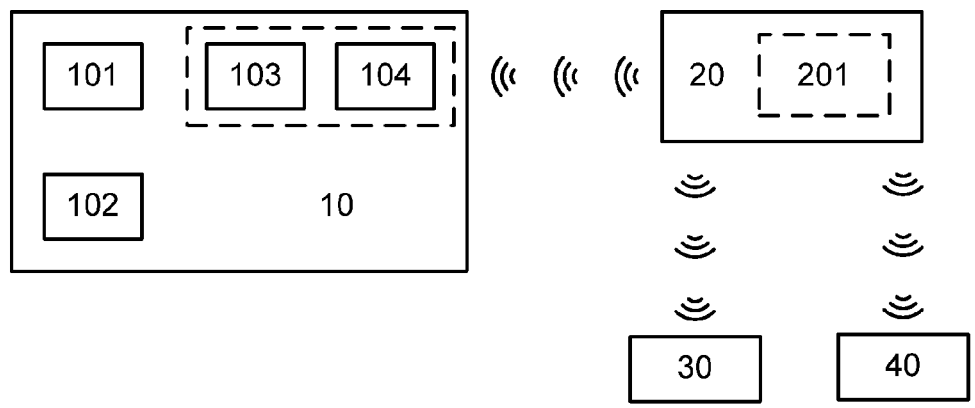
FIG. 2 is a diagram illustrating communications in a display apparatus analysis system according to another embodiment of the disclosure.

As shown in FIG. 2, preferably, the server 20 is further configured to: compare the weight with a predetermined weight; transmit the prompt information to a maintenance terminal 30, when the weight is greater than the predetermined weight; and transmit self-maintenance information corresponding to the weight back to the display apparatus 10 so that the display apparatus 10 performs a maintenance operation corresponding to the self-maintenance information to maintain the fault by itself, when the weight is less than or equal to the predetermined weight.

Figure 3:
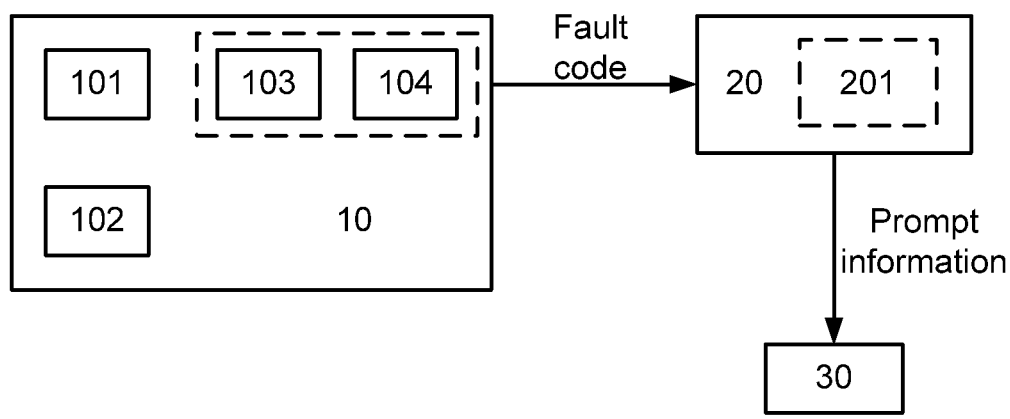
FIG. 3 is a diagram illustrating communications in a display apparatus analysis system according to a further embodiment of the disclosure.
Figure 4:
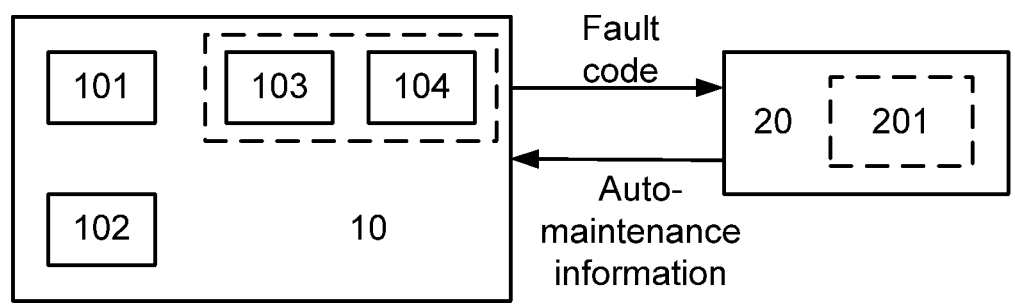
FIG. 4 is a diagram illustrating communications in a display apparatus analysis system according to an additional embodiment of the disclosure.

As shown in FIG. 3, the database 201 may further store the predetermined weight. The server may compare the weight with the predetermined weight. If the weight is greater than the predetermined weight thus indicating that the fault is severe, then the generated prompt information is transmitted to the maintenance terminal 30, so that the maintainer at the maintenance terminal 30 quickly and accurately repairs the fault. As shown in FIG. 4, if the weight is lower than the predetermined weight thus indicating that the fault is minor, then the self-maintenance information corresponding to the weight is found by searching the database 201 and transmitted to the display apparatus 10, which repairs the fault by itself based on the self-maintenance information.

For example, the predetermined weight is 1.5, and the weight obtained by the server is 1 which corresponds to the fault type "Voltage sampling failure". Since the weight 1 is lower than the predetermined weight 1.5 thus indicating that the fault is minor, then the auto-maintenance information "Restart" corresponding to the weight 1 is found and transmitted back to the display apparatus 10. The display apparatus 10 operates according to the auto-maintenance information, that is, the display apparatus 10 restarts, so as to redo voltage sampling.

Preferably, the display apparatus 10 transmits self-maintenance failure information to the server 20 in case the self-maintenance fails, and the server 20 is configured to generate the prompt information and transmit the prompt information to the maintenance terminal 30.

If the fault is not repaired after the display apparatus 10 operates according to the auto-maintenance information, the display apparatus 10 determines that the maintenance fails and transmits the self-maintenance failure information to the server 20, so that the server transmits the prompt information to the maintenance terminal 30 in order to prompt the maintainer at the maintenance terminal 30 to repair the display apparatus 10 in time.

Preferably, when the weight is greater than the predetermined weight, the server 20 is further configured to obtain maintenance information for a fault of the fault type according to historical data and transmit the maintenance information to the maintenance terminal 30.

The database 201 may further store maintenance information corresponding to each type of fault. After obtaining the fault type, the server 20 may retrieve the corresponding maintenance information from the database 201 and transmits it to the maintenance terminal 30, so that the maintainer repairs the display apparatus 10 according to the maintenance information already available to him without having to considering a maintenance scheme in time.

Preferably, when the weight is greater than the predetermined weight, the server is further configured to acquire leaving factory information of the display apparatus and transmit the leaving factory information to the maintenance terminal.

Figure 5:
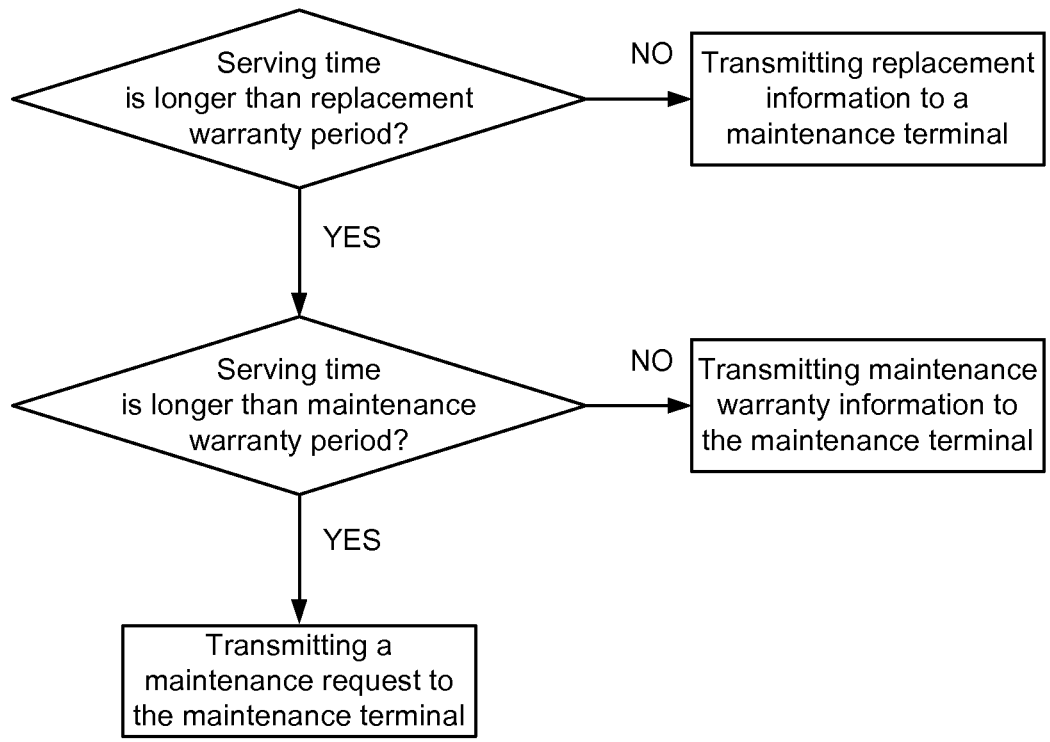
FIG. 5 is a flowchart illustrating how a server makes judgment based on leaving factory information according to an embodiment of the disclosure.

As shown in FIG. 5, preferably, the server 20 determines whether a serving time of the display apparatus 10 is longer than a replacement warranty period or not based on the leaving factory information or not. If the serving time is shorter than or equal to the replacement warranty period, then the server 20 transmits replacement information to the maintenance terminal. If the serving time is longer than the replacement warranty period, then the server 20 determines whether the serving time is longer than a maintenance warranty period or not. If the serving time is shorten than or equal to the maintenance warranty period, then the server 20 transmits maintenance warranty information to the maintenance terminal. If the serving time is longer than the maintenance warranty period, then the server 20 transmits a maintenance request to the maintenance terminal.

The database 201 may further store leaving factory information corresponding to each display apparatus 10. The leaving factory information may include a manufacturer, a replacement warranty period, a maintenance warranty period, etc. of the display apparatus. When a severe fault occurs in the display apparatus 10, the server 20 may extract the replacement warranty period of the display apparatus 10 from the leaving factory information and determine whether the serving time of the display apparatus 10 is longer than the replacement warranty period or not. If the serving period is short than or equal to the replacement warranty period thus indicating that the display apparatus 10 can be returned to the manufacturer for replacement, then the server transmits the replacement information to the maintenance terminal 30 so that the maintainer returns the display apparatus 10 to the manufacturer for replacement. If the serving time is longer than the replacement warranty period, the server may further determine whether the serving time of the display apparatus 10 is longer than the maintenance warranty period or not. If the serving time is shorter than or equal to the maintenance warranty period thus indicating that the display apparatus 10 can be returned to the manufacturer for maintenance, then the server transmits the maintenance warranty information to the maintenance terminal 30 so that the maintainer returns the display apparatus 10 to the manufacturer for maintenance. By transmitting the replacement information or the maintenance warranty information from the server to the maintenance terminal 30, it is possible for the maintainer to quickly determine whether the display apparatus 10 in which a fault occurs can be returned to the factory for replacement or maintenance without having to repair it.

Figure 6:
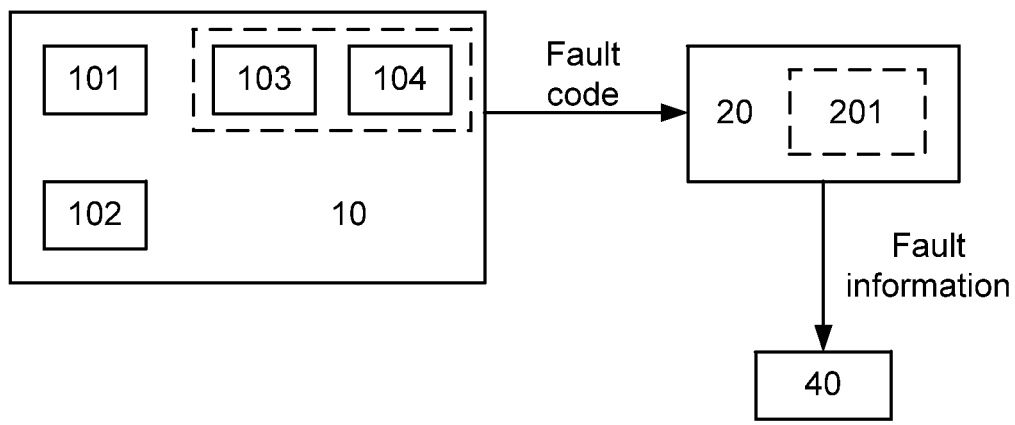
FIG. 6 is a diagram illustrating communications in a display apparatus analysis system according to yet another embodiment of the disclosure.

As shown in FIG. 6, preferably, the server 20 is further configured to obtain a manufacturer terminal 40 of the display apparatus from the leaving factory information and transmit the fault information to a manufacturer terminal 40.

When a fault occurs in the display apparatus 10, the server 20 may transmit the fault information obtained by parsing the fault code to the manufacturer terminal 40, so that the manufacturer terminal 40 records the fault information of the product in time in order to perform high-speed statistical analysis and accordingly optimize and improve future products.

Figure 7:
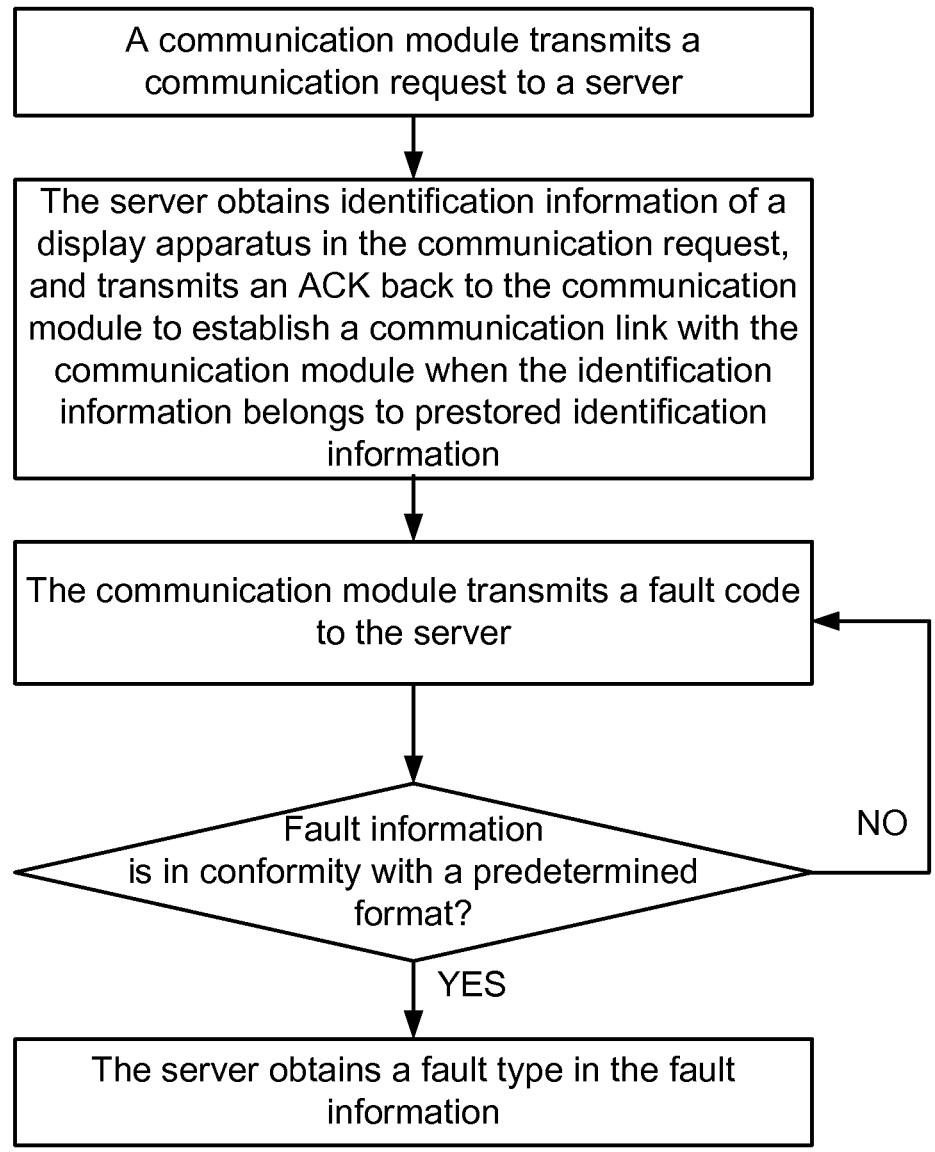
FIG. 7 is a flowchart illustrating how a communication module and a server establishes a communication link according to an embodiment of the disclosure.

As shown in FIG. 7, preferably, before transmitting the fault code to the server 20, the communication module 104 is further configured to transmit a communication request to the server 20 and establish a communication link with the server after receiving an acknowledgement transmitted back from the server. The server 20 obtains identification information of the display apparatus 10 from the communication request, and transmits the acknowledgement to the communication module 104 when the identification information is matched with prestored identification information.

Preferably, the server 20 is further configured to: check the fault information to determine whether the fault information is in conformity with a predetermined format or not; obtain the fault type from the fault information, if the fault information is in conformity with the predetermined format; transmit a retransmission request back to the communication module so that the communication module 104 retransmits the fault code, if the fault information is not in conformity with the predetermined format.

When a 2G communication module is used as the communication module 104, the communication module 104 is provided with a SIM card for handling incoming and outgoing data services. The number of the SIM card may be used as the identification information of the display apparatus 10 (of course, some other form of identification information may be used as required). The communication request transmitted from the communication module 104 to the server 20 may be as illustrated in Table 2.

TABLE 2

| Header | Instruction | Terminal ID | SIM card ID | Check code |
|---|---|---|---|---|
| 2 bytes | 1 byte | 3 bytes | 20 bytes | 1 byte |
| 0x5555 | 0x01 | 0xXXXXXX | ASCII code | CRC check |

Thus, the communication request may include such information as a header, an instruction, a SIM card ID, a check code, etc. After receiving the communication request as illustrated in Table 2, the server 20 obtains the identification information of the display apparatus 10 (i.e., terminal ID) from the communication request and compares it with the prestored identification information in the database 201. If the prestored identification information includes the terminal ID, then the server 20 transmits an acknowledgement back to the communication module 104, allowing the communication module 14 to establish a communication link with the server 20. If the prestored identification information does not include the terminal ID, then the server 20 transmits an illegality indication to the communication module 104, prohibiting the communication module 104 from establishing a communication link with the server 20. Thus, an illegal terminal can be prevented from establishing a communication link with the server 20. The information transmitted by the server 20 back to the communication module 104 is as illustrated in Table 3.

TABLE 3

| Header | Instruction | Response code | Check code |
|---|---|---|---|
| 2 bytes | 1 byte | 1 byte | 1 byte |
| 0x5555 | 0x01 | 0x01: allow terminal to transmit data<br>0x02: prohibiting terminal from transmitting data<br>Others: illegal | CRC check |

After the communication module 104 establishes a communication link with the server 20, the communication module 104 transmits the fault code to the server 20. The fault code may be illustrated as Table 4.

TABLE 4

| Header | Instruction | Terminal ID | Fault type | Check code |
|---|---|---|---|---|
| 2 bytes | 1 byte | 3 bytes | 2 bytes | 1 byte |
| 0x5555 | 0x02 | 0xXXXXXX | 0xXXXX | CRC check |

The server 20 parses the fault code to obtain the fault information and checks the fault information (for example by using Cyclic Redundancy Check code, namely, CRC) to determine whether its format is in conformity with the predetermined format or not. If the format is in conformity with the predetermined format thus indicating the received information is legal, then the server 20 transmits a legality indication as the response information and allows the communication module 104 to continue its transmission. If the format is not in conformity with the predetermined format thus indicating the received information is illegal, then the server 20 transmits an illegality indication as the response information and requires the communication module 104 to perform retransmission or terminate its transmission so as to prevent illegal information from entering the server 20. The response information transmitted by the server 20 back to the communication module 104 is as illustrated in Table 5.

TABLE 5

| Header | Instruction | Response code | Check code |
|---|---|---|---|
| 2 bytes | 1 byte | 1 byte | 1 byte |
| 0x5555 | 0x02 | 0x01: legal data<br>0x02: illegal data, please retransmit<br>0x03: terminate transmission<br>Others: illegal | CRC check |

After obtaining the fault information by parsing the fault code, the server 20 may record the fault information in the database 201 for further statistical analysis.

Figure 8:
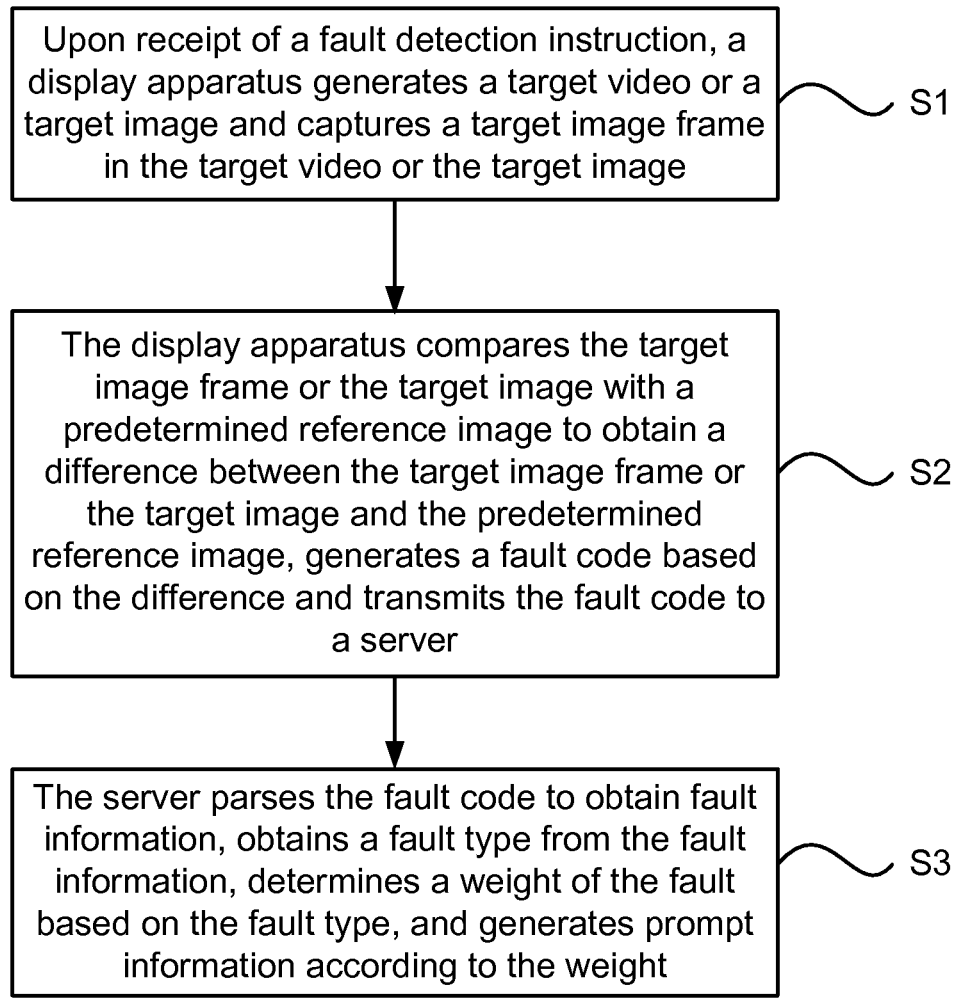
FIG. 8 is a flowchart illustrating a display apparatus fault analysis method according to an embodiment of the disclosure.

As shown in FIG. 8, a display apparatus fault analysis method according to an embodiment of the disclosure comprises the following steps:

S1. Upon receipt of a fault detection instruction, a display apparatus generates a target video or a target image and captures a target image frame in the target video or the target image.

S2. The display apparatus compares the target image frame or the target image with a predetermined reference image to obtain a difference between the target image frame or the target image and the predetermined reference image, generates a fault code based on the difference and transmits the fault code to a server.

S3. The server parses the fault code to obtain fault information, obtains a fault type from the fault information, determines a weight of the fault based on the fault type, and generates prompt information according to the weight.

It shall be noted that the display apparatus in the embodiments may be any product or component with a display function, such as an electronic paper, a handset, a tablet computer, a television, a notebook computer, a digital photo frame, a navigator, etc.

In the embodiments of the disclosure, the term "a plurality of" refers to two or more, unless explicitly specified otherwise.

The above contents are just preferred embodiments of the disclosure and are not intended to limit the disclosure is not limited thereto. For those skilled in the art, the embodiments of the disclosure are open to various changes and modifications. Any alterations, equivalent replacements, improvements, etc. made within the spirit and scope of the disclosure shall be encompassed by the protection scope of the disclosure.

What is claimed is:

1. A display apparatus fault analysis system, comprising:
    a display apparatus configured to, upon receipt of a fault detection instruction, generate a target video or a target image, capture a target image frame in a target video or a target image, compare the target image frame or the target image with a predetermined reference image to obtain a difference between the target image frame or the target image and the predetermined reference image, and generate a fault code based on the difference and transmitting the fault code to the server; and
    a server configured to parse the fault code to obtain fault information, look up a fault type in a prestored fault table based on the fault information, determine a weight of a fault based on the fault type, and generate prompt information according to the weight;
    wherein the server is further configured to
        compare the weight with a predetermined weight,
        transmit the prompt information to a maintenance terminal, when the weight is greater than the predetermined weight, and
        transmit self-maintenance information corresponding to the weight back to the display apparatus so that the display apparatus performs a maintenance operation corresponding to the self-maintenance information to repair the fault by itself, when the weight is less than or equal to the predetermined weight.

2. The display apparatus fault analysis system according to claim 1, wherein the display apparatus is configured to transmit self-maintenance failure information to the server in case the self-maintenance fails, and the server is configured to generate the prompt information and transmit the prompt information to the maintenance terminal.

3. The display apparatus fault analysis system according to claim 2, wherein the communication module is further configured to transmit a communication request to the server before transmitting the fault code to the server and establish a communication link with the server after receiving an acknowledgement transmitted from the server, and
    the server obtains identification information of the display apparatus from the communication request, and transmits the acknowledgement back to the communication module when the identification information is matched with prestored identification information.

4. The display apparatus fault analysis system according to claim 2, wherein the server is further configured to
    check the fault information to determine whether the fault information is in conformity with a predetermined format or not;
    obtain the fault type from the fault information, if the fault information is in conformity with the predetermined format; and
    transmit a retransmission request back to the communication module so that the communication module retransmits the fault code, if the fault information is not in conformity with the predetermined format.

5. The display apparatus fault analysis system according to claim 1, wherein the server is further configured to, when the weight is greater than the predetermined weight, obtain maintenance information for a fault of the fault type according to historical data and transmit the maintenance information to the maintenance terminal.

6. The display apparatus fault analysis system according to claim 5, wherein the communication module is further configured to transmit a communication request to the server before transmitting the fault code to the server and establish a communication link with the server after receiving an acknowledgement transmitted back from the server, and
    the server obtains identification information of the display apparatus from the communication request, and transmits the acknowledgement back to the communication module when the identification information is matched with prestored identification information.

7. The display apparatus fault analysis system according to claim 5, wherein the server is further configured to
    check the fault information to determine whether the fault information is in conformity with a predetermined format or not;
    obtain the fault type from the fault information, if the fault information is in conformity with the predetermined format; and
    transmit a retransmission request back to the communication module so that the communication module retransmits the fault code, if the fault information is not in conformity with the predetermined format.

8. The display apparatus fault analysis system according to claim 1, wherein the server is further configured to, when the weight is greater than the predetermined weight, acquire leaving factory information of the display apparatus and transmit the leaving factory information to the maintenance terminal.

9. The display apparatus fault analysis system according to claim 8, wherein the server is configured to:
    determine whether a serving time of the display apparatus is longer than a replacement warranty period or not based on the leaving factory information;
    transmit replacement information to the maintenance terminal, if the serving time is shorter than or equal to the replacement warranty period;
    determine whether the serving time is longer than a maintenance warranty period or not, if the serving time is longer than the replacement warranty period;
    transmit maintenance warranty information to the maintenance terminal, if the serving time is shorter than or equal to the maintenance warranty period; and
    transmit a maintenance request to the maintenance terminal, if the serving time is longer than the maintenance warranty period.

10. The display apparatus fault analysis system according to claim 8, wherein the server is further configured to obtain a manufacturer of the display apparatus from the leaving factory information and transmit the fault information to a manufacturer terminal.

11. The display apparatus fault analysis system according to claim 8, wherein the communication module is further configured to transmit a communication request to the server before transmitting the fault code to the server and establish a communication link with the server after receiving an acknowledgement transmitted from the server, and the server obtains identification information of the display apparatus from the communication request, and transmits the acknowledgement to the communication module when the identification information belongs to prestored identification information.

12. The display apparatus fault analysis system according to claim 8, wherein the server is further configured to check the fault information to determine whether the fault information is in conformity with a predetermined format or not;

obtain the fault type from the fault information, if the fault information is in conformity with the predetermined format; and transmit a retransmission request back to the communication module so that the communication module retransmits the fault code, if the fault information is not in conformity with the predetermined format.

13. The display apparatus fault analysis system according to claim 1, wherein the communication module is further configured to transmit a communication request to the server before transmitting the fault code to the server and establish a communication link with the server after receiving an acknowledgement transmitted back from the server, and the server obtains identification information of the display apparatus from the communication request, and transmits the acknowledgement back to the communication module when the identification information is matched with prestored identification information.

14. The display apparatus fault analysis system according to claim 1, wherein the server is further configured to check the fault information to determine whether the fault information is in conformity with a predetermined format or not;

obtain the fault type from the fault information, if the fault information is in conformity with the predetermined format; and transmit a retransmission request back to the communication module so that the communication module retransmits the fault code, if the fault information is not in conformity with the predetermined format.

15. A method for use in a display apparatus fault analysis system according to claim 1, the method comprising:

upon receipt of a fault detection instruction, the display apparatus generating a target video or a target image and capturing a target image frame in the target video or the target image;

the display apparatus comparing the target image frame or the target image with a predetermined reference image to obtain a difference between the target image frame or the target image and the predetermined reference image, generating a fault code based on the difference and transmitting the fault code to the server; and the server parsing the fault code to obtain fault information, obtaining a fault type from the fault information, determining a weight of the fault based on the fault type, generating prompt information according to the weight, and comparing the weight with the predetermined weight;

wherein the server transmitting the prompt information to a maintenance terminal, when the weight is greater than the predetermined weight, and transmitting self-maintenance information corresponding to the weight back to the display apparatus so that the display apparatus performs a maintenance operation corresponding to the self-maintenance information to repair the fault by itself, when the weight is less than or equal to the predetermined weight.

* * * * *